United States Patent [19]

Young

[11] 4,243,841

[45] Jan. 6, 1981

[54] DIGITALLY ACTIVATED COIN CONTROL CIRCUIT

[75] Inventor: John S. Young, Scottsdale, Ariz.

[73] Assignee: GTE Automatic Electric Laboratories Incorporated, Northlake, Ill.

[21] Appl. No.: 78,414

[22] Filed: Sep. 24, 1979

[51] Int. Cl.³ .......................................... H04M 17/00
[52] U.S. Cl. ............................................... 179/6.3 R
[58] Field of Search ................... 179/6.3 R, 6.31, 6.5, 179/18 B

[56] References Cited

U.S. PATENT DOCUMENTS

| | | | |
|---|---|---|---|
| 3,278,693 | 10/1966 | Sherstiuk | 179/6.3 R |
| 3,456,081 | 7/1969 | Pharis et al. | 179/6.3 R |
| 3,760,112 | 9/1973 | Busch | 179/6.3 R |
| 4,174,468 | 11/1979 | Stelte | 179/6.3 R |

Primary Examiner—Gerald L. Brigance
Attorney, Agent, or Firm—Robert J. Black; Frank J. Bogacz

[57] ABSTRACT

A digitally activated coin control circuit for use in combination with a digitally activated ringing circuit for common manipulation of a prepaid coin station by a central processing unit of a telephone switching center to collect and alternatively to refund deposited coins.

8 Claims, 1 Drawing Figure

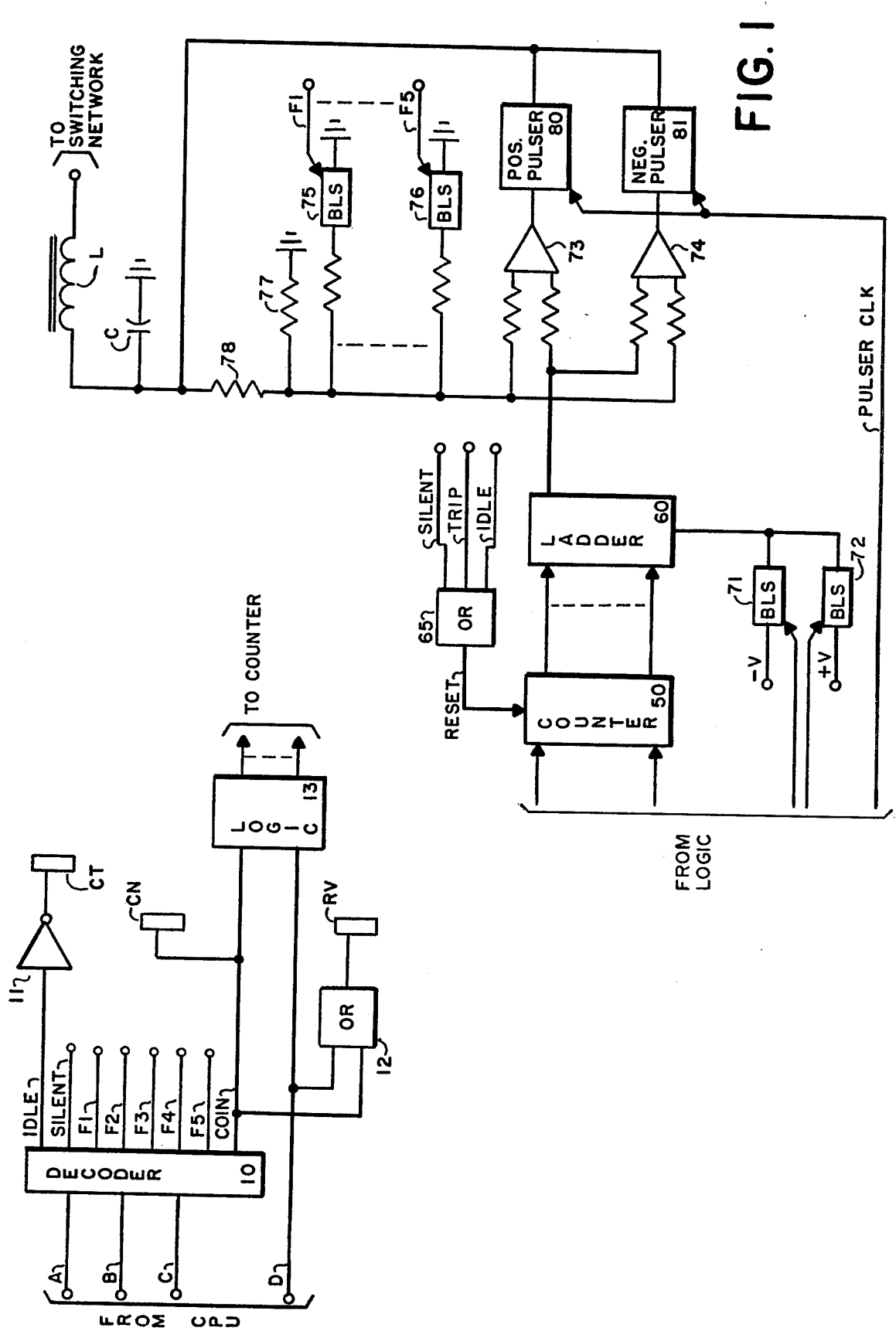

DIGITALLY ACTIVATED COIN CONTROL CIRCUIT

BACKGROUND OF THE INVENTION (1) Field of the Invention

The present invention relates to a coin collection/refund circuit and more particularly to a digitally activated coin control circuit for use in combination with a digitally activated ringing circuit for common manipulation by a central processing unit associated with telephone switching center of a prepaid coin station to collect and refund deposited coins.

(2) Description of the Prior Art

Typically, coin control circuitry has been implemented via a collection of analog circuit equipment. With the advent of computer control electronic switching systems, a need arose for simple interfacing between computer controlled and coin controlled circuitry. Usually, elaborate interface connections had to be designed for interfacing the computer controled logic with the logic of the coin control circuit. The logic of computers is digital in nature and of relatively low power, whereas the logic of coin control circuitry is analog in nature. Such analog interface circuits as those mentioned are costly and complex in design.

In order for a telephone switching center to manipulate a prepaid coin telephone station, several different types of circuits had to be connected one at a time to the coin station. For example, initially a coin control circuit was connected to the pay station line to perform coin control manipulations, such as returning coin for a free call number. Once the called number was dialed and the switching center made proper connections to the called subscriber a ringing circuit had to be connected to the line. After completion of the call, the coin control circuit again had to be connected to the line to perform the function of collection of the coin.

One such typical coin detection circuit is shown by U.S. Pat. No. 3,760,112 issued on Sept. 18, 1973 to J. E. Busch.

Therefore, it is the object of the present invention to provide a coin control circuit for use in a computer control telephone central office to digitally interface between the central processing unit of a telephone switching center and a switching network, to provide for common manipulation of ringing signal generation and coin control function for a prepaid coin telephone station.

It is the feature of the present invention to provide the coin control function with the ringing signal generation function so that separate circuits are not required for these functions and so that the computer controller of the telephone central office may make only one connection to the prepaid coin station, thereby minimizing the time required to handle a particular coin station.

SUMMARY OF THE INVENTION

The present invention comprises a coin control circuit for use in a telephone switching center having a central processing unit for connection between said central processing unit and a switching network of a telephone switching center. The coin control circuit includes a 1 of 8 decoder connected to the central processing unit (CPU) of the telephone switching center. Logic circuitry is connected to the decoder. An up-/down counter is connected between the circuit logic and a resistive ladder network. This resistive network is a conventional R/2R resistor ladder network. The resistor ladder network is connected to two voltage comparators, each voltage comparator is in turn connected to an associated pulser network. The pulser networks are connected in common to a capacitor and to the telephone office switching network through a coupling inductor. Under control of the CPU, the coin control function of this circuit is selected. The decoder detects the coin control function from a combination of 3 input leads. The coin control function may be selected for the silent mode of operation during the ringing cycle and also for the period of time after ring trip is detected. For this mode of operation the coin control circuit applies a −50 volt potential to the switching network.

By means of a fourth input lead from the CPU, circuit logic determines the particular type of coin control function that was requested by the CPU. These functions are coin refund and coin collection. For the coin collect function the circuit generates a positive DC voltage of between 110–130 volts, whereas for the coin refund function the circuit generates a negative voltage of 110–130 volts. The circuit logic generates a number representative of the magnitude of the voltage to be applied by the circuit. This particular number is used to preset the counter to produce a binary number representative of the magnitude of the voltage. In addition the circuit logic enables the appropriate one of two bilateral switches to provide a positive or a negative input potential to the resistive ladder network, thereby determining the coin collect or coin refund functions.

The resistive ladder network operates based upon the binary number input from the counter to perform a summing function based upon the binary representation of the number produced by the counter. The approriate one of two voltage comparators is operated in response to the voltage produced by the ladder network. One produces a logic "1" condition for the positive voltage and the other for the negative voltage.

In response to the operation of the voltage comparator, and associated pulser produces the desired magnitude of the output voltage. The pulser clock inputs to the respective pulser circuits is at a logic "1" level thereby the pulser networks produce a DC level instead of a series of pulses. This DC level is coupled to the switching network for condition to the pay station.

DESCRIPTION OF THE DRAWING

The single sheet of drawings included herewith comprises a schematic diagram of a digitally activated coin control circuit emboding the principles of operation of the present invention.

DESCRIPTION OF THE PREFERRED EMBODIMENT

The present invention is a coin control circuit for use in a telephone switching center connected between a central processing unit (CPU) and the switching network of the telephone switching center. This coin control circuit shares common circuitry of an associated ringing circuit. The coin control circuit includes a decoder 10 connected to the CPU of the telephone switching center. Circuit logic 13 is connected to the decoder 10 circuit logic 13 has output connections to counter 50 and counter 50 is in turn connected via an 8 bit wide bus to resistive ladder network 60. Resistive ladder network 60 is connected to voltage comparators 73 and 74 which are in turn connected to pulser circuits 80 and 81 respectively. Pulsers 80 and 81 are connected to the switching network via inductor L and capacitor C.

Decoder circuit 10 may be implemented via an MSI circuit part number SN54S138 or SN74S138. Counter 50 may be implemented via two LSI circuits part number SN54192 or SN74192. Two circuits are connected in cascade fashion so that an 8 bit wide output channel is produced, since each circuit is capable of providing a 4 bit wide output channel. Bilateral switches 71 and 72 may be implemented with integrated circuits part number 4016B, CMOS devices manufactured by Fairchild Semiconductors Inc. Voltage comparators 73 and 74 may be implemented with LSI circuits part number SN5485 or SN7485. OR gates such as 12 and 65 may be implemented via SSI circuits part number SN7450. Resistive ladder network 60 is composed of 7 vertical members of a resistance value of R and 8 horizontal members of a resistance value of 2 times R. All components unless otherwise stated are commercially available units manufactured by the Texas Instruments Corporation et al. The CPU and switching network may be implemented via a No. 2 EAX manufactured by GTE Automatic Electric Inc. or other similar system.

The CPU of the telephone switching center selects the mode of operation of the circuit via leads A, B and C, thereby providing for the silent operation of the circuit ($-50$ volts), for coin collect function (110 to 130 volts) and the coin refund function ($-110$ to $-130$ volts). Decoder 10 determines whether the coin mode of operation has been selected and transmits an indication to logic 13. By means of another lead D from the CPU logic 13 operates to determine whether the refund or collection function has been indicated. Logic 13 operates the appropriate one of bilateral switches 71 and 72 depending upon whether the coin collect or refund function was selected bilateral switch 71 being operated for refund and bilateral switch 72 being operated for collection function. Further, logic 13 operates counter 50 to preset it to the predetermined value representing the magnitude of the voltage to be produced by the circuit.

Counter 50 transmits this binary number to resistive ladder network 60 where the binary number is summed and converted to an analog value representing the magnitude and sign of the DC signal to be produced. In addition, logic 13 selects the appropriate pulser circuit 80 or 81 depending upon whether the coin collect or refund function was selected and places a logic "1" on the PULSER CLK lead in order to enable the corresponding pulser circuit. Voltage comparator 73 operates for the coin collect function to enable pulser 80 to produce the required positive DC potential for coupling to the switching nework for the coin collect function. Voltage comparator 74 operates similarly to enable pulser 81 to produce the proper negative DC potential for coupling to the switching network for the coin fund function.

As a result, the pay station is operated to either collect or to refund the coin and may also be selected for the silent operation during the ringing cycle or after the ring trip is detected. Additionally, this circuit may provide ringing functions via additional circuit components which are not shown. Therefore, this single circuit may be connected to the switching network in order to perform both the functions of ringing and coin control obviating the need for multiple connection of separate and distinct circuits to perform these functions.

Although a preferred embodiment of the invention has been illustrated, and that formed described in detail, it will be readily apparent to those skilled in the art that various modifications may be made therein without departing from the spirit of the invention or from the scope of the appended claims.

What is claimed is:

1. A digitally activated coin control circuit for use in combination with a digitally activated ringing circuit for common manipulation of a prepaid coin station to collect and alternatively to refund deposited coins, said coin control circuit connected between a telephone central processor and a telephone switch network operated in response to binary coded signals from said telephone central processor to produce direct current signals of a first, a second and a third characteristic, said signals of said first and second characteristics for performing said coin collection and alternatively said coin refund operations, said coin control circuit comprising:

decoding means connected to said telephone central processor and operated in response to said binary coded signal to detect whether a coin control operation is required and further operated to detect which of said particular coin control operations is required;

circuit logic means connected to said decoding means and operated in response to said detection of said required coin control operation to produce a first output signal and a second output signal;

counting means connected to said circuit logic means and operated in response to said first output signal to produce a plurality of output signals representative of said first output signal;

circuit switching means connected to said circuit logic means and operated in response to said second output signal to produce a sign output of a first characteristic and alternatively of a second characteristic;

resistive network means connected to said counting means and to said circuit switching means, operated in response to said sign output signal of a first characteristic and alternatively operated in response to said sign output signal of a second characteristic to transmit said sign output signal;

said resistive network means further operated in response to said plurality of output signals to sum said plurality of signals to produce a single signal representative of said direct current signal of a first characteristic and alternatively to produce a single signal representative of said direct current signal of a second characteristic; and circuit coupling means connected between said resistive network means and said telephone switching network, and operated in response to said single signal representative of said direct current signals of said first and alternatively of said second characteristic and said sign output signal to transmit a final output signal to said telephone switching network whereby said prepay coin station is operated to collect a deposited coin and alternatively operated to refund a deposited coin.

2. A digitally activated coin control circuit as claimed in claim 1, wherein: said decoding means includes a 1 out of 8 decoder operated in response to said binary coded signals of said telephone central processor to produce a signal representing selection of the circuit for operation in the coin control mode.

3. A digitally activated coin control circuit as claimed in claim 1, wherein: said circuit logic means is further connected to said counting means and to said circuit switching means and said circuit logic means is operated to preset said counting means to a predetermined value.

4. A digitally activated coin control circuit as claimed in claim 3, wherein: said circuit logic means is further operated to produce first and second control signals for coupling to said circuit switching means.

5. A digitally activated coin control circuit as claimed in claim 1, wherein: said counting means includes an up-down counter circuit connected between said circuit logic and said resistive network means and operated in response to a predetermined count number to produce a binary number representing said count number.

6. A digitally activated coin control circuit as claimed in claim 1, wherein: said resistive network means includes first and second voltage comparators, said first voltage comparator operated in response to said sign output signal of a first characteristic and said second voltage comparator operated in response to said sign output signal of a second characteristic.

7. A digitally activated coin control circuit as claimed in claim 6, wherein: said resistive network means further includes first and second pulser circuits connected respectively to said first and said second voltage comparators, said first pulser circuit operated in response to said operation of said first voltage comparator to produce a positive potential for coin collection operation and said second pulser circuit operated in response to said operation of said second voltage comparator to produce a negative potential for providing said coin refund operation.

8. A digitally activated coin control circuit as claimed in claim 1, wherein: said counting means is operated in response to detection of a silent request signal to inhibit operation of said resistive network means whereby a direct current signal of said third characteristic is transmitted to said switching network.

* * * * *